Nov. 1, 1927. 1,647,232
K. KIEFER
METHOD OF FILLING CONTAINERS WITH PASTES AND THE LIKE
Filed March 18, 1925
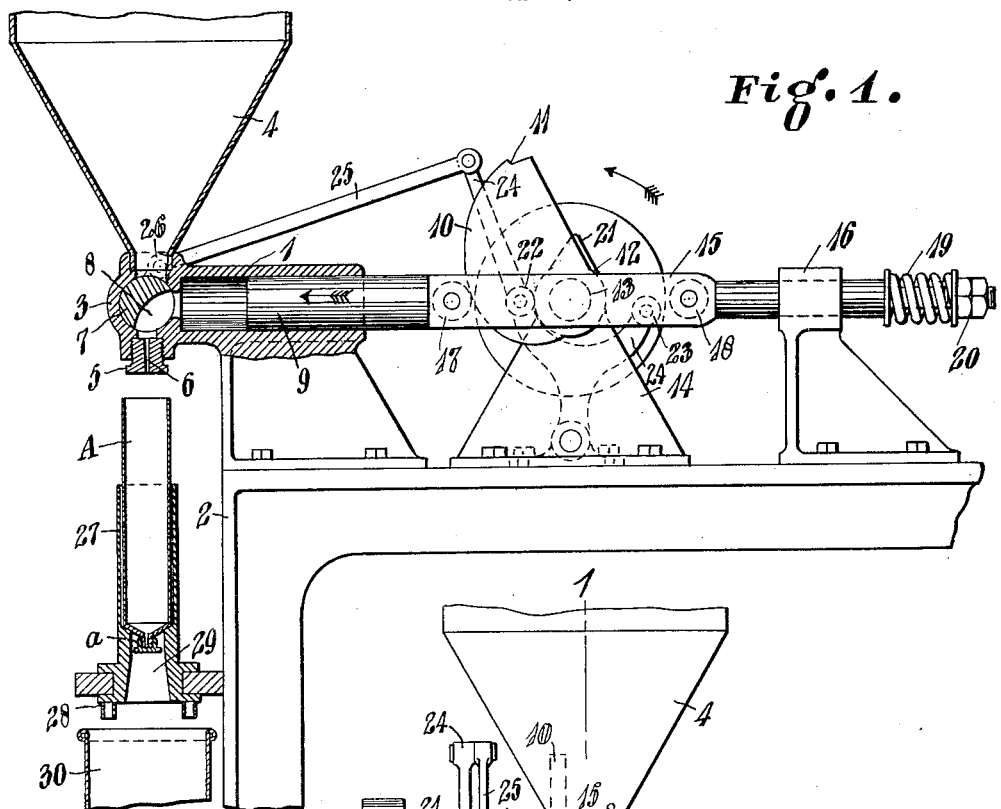
Fig. 1.
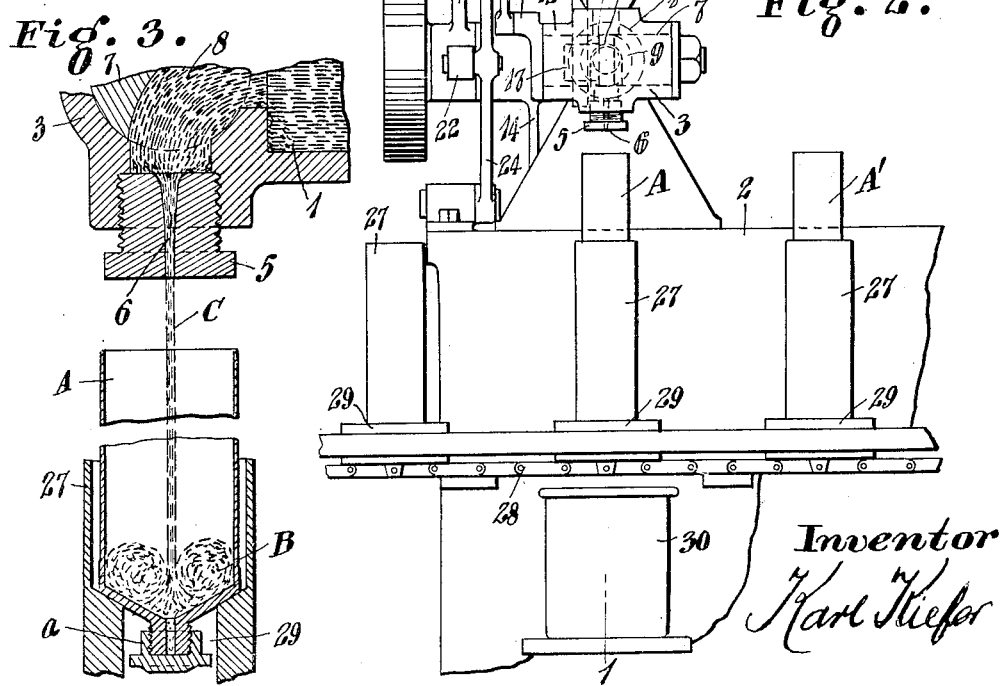
Fig. 2.
Fig. 3.
Inventor
Karl Kiefer Patented Nov. 1, 1927.

1,647,232

UNITED STATES PATENT OFFICE.

KARL KIEFER, OF CINCINNATI, OHIO.

METHOD OF FILLING CONTAINERS WITH PASTES AND THE LIKE.

Application filed March 18, 1925. Serial No. 16,417.

My invention relates to filling containers with substances, and its object is to facilitate the filling of containers with substances which are coherent, with very slight fluidity, so that if permitted to enter the containers according to the usual methods of filling mobile liquids they do not distribute themselves uniformly throughout the interior of the container but pile up in separated masses. A further object of my invention is, by virtue of my improved method of filling such substances, to permit the apparatus to be simplified and to be operated more rapidly and effectively than apparatus heretofore employed in filling such substances. Other objects will appear in the course of the ensuing description.

I attain these objects by the device illustrated, for example, in the accompanying drawing, in which—

Figure 1 is a sectional side elevation of part of a filling machine embodying my invention and operating according to my method, the section being in the vertical plane of the line 1—1 of Fig. 2;

Fig. 2 is a front elevation of the same; and

Fig. 3 is a fragmentary vertical section corresponding to that of Fig. 1, enlarged better to illustrate the mode of entrance of the substance into the container.

The usual method of filling such substances as pastes, butters, greases, ointments, jellies and gelatinous substances, and other semi-fluid viscid or coherent substances of such nature, has been to insert a tube close to the bottom of the container and withdraw the tube while causing the substance to enter the container through the tube, so that the outlet end of the tube always is slightly in advance of the rising level of the substance. This method utilizes the substance emerging from the tube outlet to push against the discharged substance and spread the discharged substance across the container, to effect the complete filling of the container without voids which would result from merely dropping the substance in from the top of the container, due to the immobility of the substance. Such methods, requiring the tube to be inserted and withdrawn, require considerable complication of the filling apparatus, and limit its speed of operation undesirably. Also, filling apparatus has been used in which the container is put onto the tube, usually by hand, and the emerging substance is allowed to push the container off as fast as it is filled. This also is slow, and is uncleanly.

As I prefer to carry out my method of filling such immobile substances, I force the substance through a relatively small orifice, preferably from above the top of the container, in a relatively small and rapid stream, so that the substance is squirted against the bottom of the container, and by its impact and momentum it spreads forcibly in all directions across the bottom of the container to the side walls thereof. This action continues as the filling progresses and the level of the substance rises in the container; the forced, concentrated stream of incoming substance continuing to spread out across the previously deposited substance and by its penetration thereof and impact thereagainst compacting the deposited substance so that no voids exist therein. The result is that when the prescribed quantity of substance thus has been squirted or injected into the container, there is a completely uniform and continuous substance closely compacted throughout the interior space of the container up to the point to which the container is desired to be filled.

The uniformity of density of the filled substance is dependent upon the uniformity of rate of injection, and therefore, to attain this uniformity of density in the most practical degree, I prefer to drive the injecting means at a practically uniform rate. It will be understood, however, that slight variation of the rate will not defeat the purpose of the method, providing its minimum is sufficient to cause the spreading and compacting effect completely enough to permit no voids to form in the substance. Moreover, the necessary speed of entrance and consequent impact and penetration may be supplied in various ways, so that my improved method is not limited to the mode of operation of the preferred form of apparatus which I exemplify herein. Of course the more mobile liquids may be injected into containers; but such a method would be impracticable with them, as they would splash entirely up to the container tops, so that a large proportion of the liquid would be spilled and the container could not be filled with such mobile liquids according to my method, nor with the use of my apparatus operating as herein described. My method, therefore, is peculiarly applicable to those substances that will not flow into a uniformly dense mass, but which, by my invention, are forced into that condition under impact which would be inoperative if applied to freely flowing liquids.

The apparatus, as illustrated, comprises the horizontal cylinder 1 attached by a suitable pedestal to the top of the table 2, with the valve chamber 3 at one end projecting past the edge of the table. This chamber has the top neck to receive the substance from the reservoir or hopper 4; and has the bottom spout in which is fitted the nozzle 5 having an outlet orifice 6 of diameter very much smaller than that of the cylinder 1. The valve 7 is cylindrical and fits in a transverse bore in the chamber 3 between the top neck and the bottom spout, and has a segmental port 8 so disposed that when the valve 7 is rotated to one position this port leads from the cylinder 1 down to the spout and the outlet orifice 6, as shown in the drawing, or when the valve 7 is rotated a quarter revolution from that position the port leads from the top neck and hopper 4 down to the cylinder 1; so that the cylinder 1 is alternately connected with the hopper 4 to the exclusion of the outlet 6, or with the outlet 6 to the exclusion of the hopper 4.

The plunger 9, herein shown as being about midway of its forward stroke, fits closely in the cylinder, and by reciprocation alternately draws substance into the cylinder 1 from the hopper 4 and discharges the substance out through the orifice 6. In receding, it creates a partial vacuum in the cylinder below the substance in the hopper 4, so that the substance is forced down into the cylinder under considerable atmospheric pressure, in addition to the pressure due to the weight of the substance in the hopper. Thus, a fairly dense body of the substance is obtained in the cylinder; and because the substance is forced out through a much contracted outlet, the density is rendered completely uniform early in the forward stroke of the plunger.

As before stated, uniform motion of the injecting means is preferred; and accordingly I prefer to operate the plunger by means of the cam 10, rather than by a crank motion. This cam 10 has its periphery, for somewhat less than 180 degrees around its axis, uniformly increasing its distance from the axis; the most radially extended end of the cam, however, preferably being cut away, forming a drop 11 radially inward, past which the periphery follows a curve concentric with the cam for a short distance, at the end of which the cam periphery recedes sharply to its hub 12, from which the uniformly rising part of the periphery starts. By means of the shaft 13 journaled horizontally fixed on the shaft 13 journaled horizontally in a pedestal 14 fixed on top of the table 2; the cam being at one end of the shaft, past which the plunger 9 has a bar 15 extending back with its rear end part guided in a pedestal 16 also fixed on the table top. Journaled on the side of this bar next to the shaft 13, with the cam 10 between them, are the rollers 17 and 18, so spaced along the bar 15 that upon the constantly rising part of the cam periphery passing forwardly and downwardly, in the rotation of the cam, the front roller 17 is engaged by said part of the cam and the bar 15 and plunger 9 are forced forward with a uniform motion; and that, upon the rearward and upward passage of the cam part the rear roller 18 is engaged thereby, forcing the bar and plunger back at a uniform rate. The bar 15, projecting back past the rear end of its bearing in the pedestal 16, is surrounded by a helical spring 19 held forward by the nuts 20 on the end of the bar; and this spring 19 reaches the rear end of the pedestal 16 before the completion of the forward stroke, with the result that when the drop 11 of the cam 10 reaches the forward roller 17, the spring 19, having been compressed in the last part of the forward stroke, suddenly draws the plunger 9 slightly backward. This motion is provided to draw in any slight protrusion of the substance from the orifice 6 at the end of the discharge, under atmospheric pressure due to the vacuum created above the orifice 6 in the cylinder by the slight recession of the plunger 9 before shifting of the valve 7. This guards against drippage.

The valve 7 is rocked by means of a second cam 21 on the shaft 13 beyond the cam 10 from the bar 15; this cam acting against rollers 22 and 23, respectively at the front and rear of the cam 21 on upstanding members of a fork 24 fulcrumed on the table 2 below the shaft 13 and having an upward extension of its front member pivoted to the rear end of the connector 25, which has its front end pivoted to a short crank arm 26 fixed on the end of the valve 7. The cams 10 and 21 are so proportioned and relatively positioned on the shaft 13 that all or most of the rocking of the valve 7 occurs while the plunger 9 is stationary at either end of its stroke due to the operating part of the cam 10 extending less than 180 degrees as before mentioned.

In the present example, the machine is arranged for filling collapsible tubes A and A' carried inverted in holders 27 on a conveyor 28 passing across the front side of the table 2 under the orifice 6; the bottom of the tube A or A' being open, as is well understood in the art, and thus becoming the top of the container with respect to the filling operation, and the top of the tube, closed by the cap a, thus becoming the bottom of the container. In Fig. 2, one of the containers A is in position for filling, and another, A', in advance, has been filled;

also, one of the holders 27, which would next reach the filling device, has no container therein, it being understood that the containers are inserted in the holders by the operator of the machine while the conveyor 28 travels intermittently, stopping with a container under the orifice 6 long enough for filling. Should one of the holders 27 fail to receive a container, upon coming under the orifice 6 the stream of substance squirted from the orifice would pass cleanly through the open bottom 29 of the holder into a suitable receptacle 30 supported on the table front directly below the orifice 6. Thus fouling of the apparatus in such cases is avoided with my invention; whereas in prior devices discharging a loose mass of substance cannot be controlled in such simple manner.

It will be seen that I avoid raising and lowering of the discharge device or the container, one or the other of which is necessary in the method involving insertion of a tube close to the bottom of the container and then withdrawing it as the discharge progresses, as before alluded to. The action of the injected stream of substance in the container is approximately illustrated in Fig. 3, where the substance B is forced out and up in all directions across the bottom of the container due to the heavy force of the rapid, relatively small stream of substance C protruded from the orifice 6 under the plunger action. This view illustrates the beginning of operation on a container, at which the plunger 9 would be back near the beginning of its stroke; but in Fig. 1 the container would be about half full, as the plunger is at the middle of its stroke in a cylinder having about the same capacity as the container, and the volume displaced by the plunger being the measure of substance filled in each container.

Collapsible tubes, such as illustrated, are well adapted as containers of pastes and the like, and are being increasingly used for such substances; hence I have illustrated them with my invention applied thereto. However, jars, cans, bottles, boxes and other containers are filled with such immobile fluid substances with the same facility by my invention. The size, and especially the cross-sectional area of the container, may dictate the size of the orifice 6 to some extent; since a wide container permits a larger orifice. But larger containers call for a larger plunger displacement, which may be provided wholly or partly by increasing the plunger diameter; and in any case the orifice 6 should be so small relative to the rate of displacement in the cylinder that a forced stream or squirting effect results from the discharge at the orifice 6. And in any use of my method, the force of impact of the incoming substance on the bottom of the container, or upon the already discharged substance, should be such as to insure the compacting and distributing operation herein described, without formation of voids in the filled body. Also, when I refer to paste or the like, I do not mean to exclude substances to which that name would be somewhat inaptly applied. The substance may be a true paste, as tooth paste, adhesive paste, polishing paste, etc., or may be a cream, as shaving cream, any of the various toilet creams, etc., or may be a more viscous substance, as fruit preparations, jellies, gelatinous products, etc., or may be a heavy oleaginous product, as greases, paints, ointments and the like. The characteristic of any of these, to make my invention applicable, is its inability to flow readily and fill the container properly, without the assistance provided in my method.

It therefore will be apparent that various uses, and various modifications of the apparatus, as well as of the method, will occur in practice; and therefore I do not wish to be understood as being limited to the precise disclosure herein, but having thus fully described my invention, in one embodiment, as is required, what I claim as new and desire to secure by Letters Patent is:

The method of filling containers with pasty material which comprises forcing at high velocity a jet of said material while in its pasty condition into the container, and directing such jet at all times so as to penetrate the mass previously deposited.

KARL KIEFER.